March 27, 1934.  B. B. ROCHESTIE  1,952,567
WEIGHING MACHINE
Filed June 8, 1932   3 Sheets-Sheet 1

Inventor
Barnett B. Rochestie
by Samuel Lebowitz
Attorney

March 27, 1934.  B. B. ROCHESTIE  1,952,567
WEIGHING MACHINE
Filed June 8, 1932   3 Sheets-Sheet 2
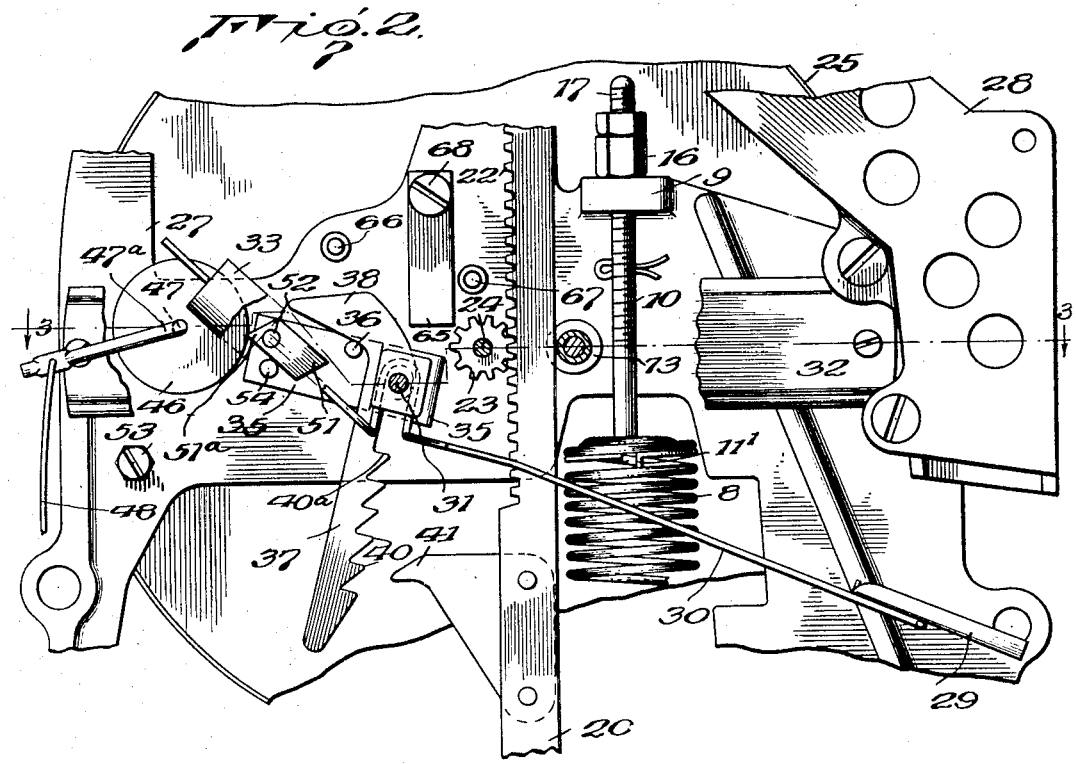
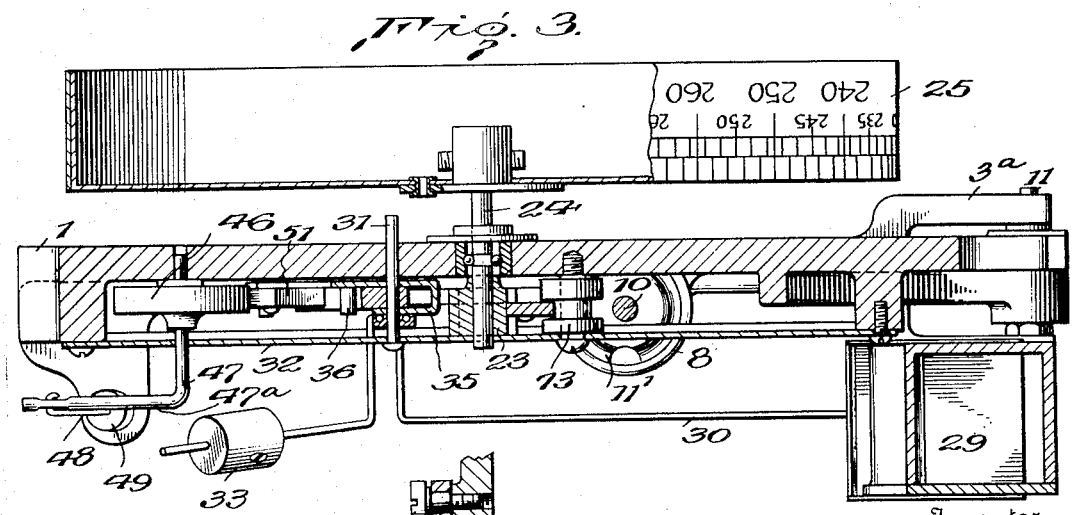

March 27, 1934.                B. B. ROCHESTIE                1,952,567
                                WEIGHING MACHINE
                               Filed June 8, 1932           3 Sheets-Sheet 3

Inventor
BARNETT B. ROCHESTIE
by Samuel Klowitz
          Attorney

Patented Mar. 27, 1934

1,952,567

UNITED STATES PATENT OFFICE 1,952,567

WEIGHING MACHINE

Barnett B. Rochestie, Trenton, N. J.

Application June 8, 1932, Serial No. 616,116

15 Claims. (Cl. 194—35)

This invention relates to an improved coin-controlled weighing machine incorporating a releasing mechanism which may be rendered effective either before or after the weight is applied to the machine.

It is an object of the invention to provide a rugged weighing mechanism capable of highly accurate results.

It is a further object of the invention to provide a novel tripping device for the release mechanism of the machine which restores the releasing parts to their normal position at the initiation of the return movement of the weighing mechanism after a weight indication has been rendered. Another object of the invention is to prevent the registry of repeated weight indications without the insertion of coins for each applied weight. The invention also contemplates means for preventing the indications of weights by the fraudulent handling of the machine.

Figure 1:
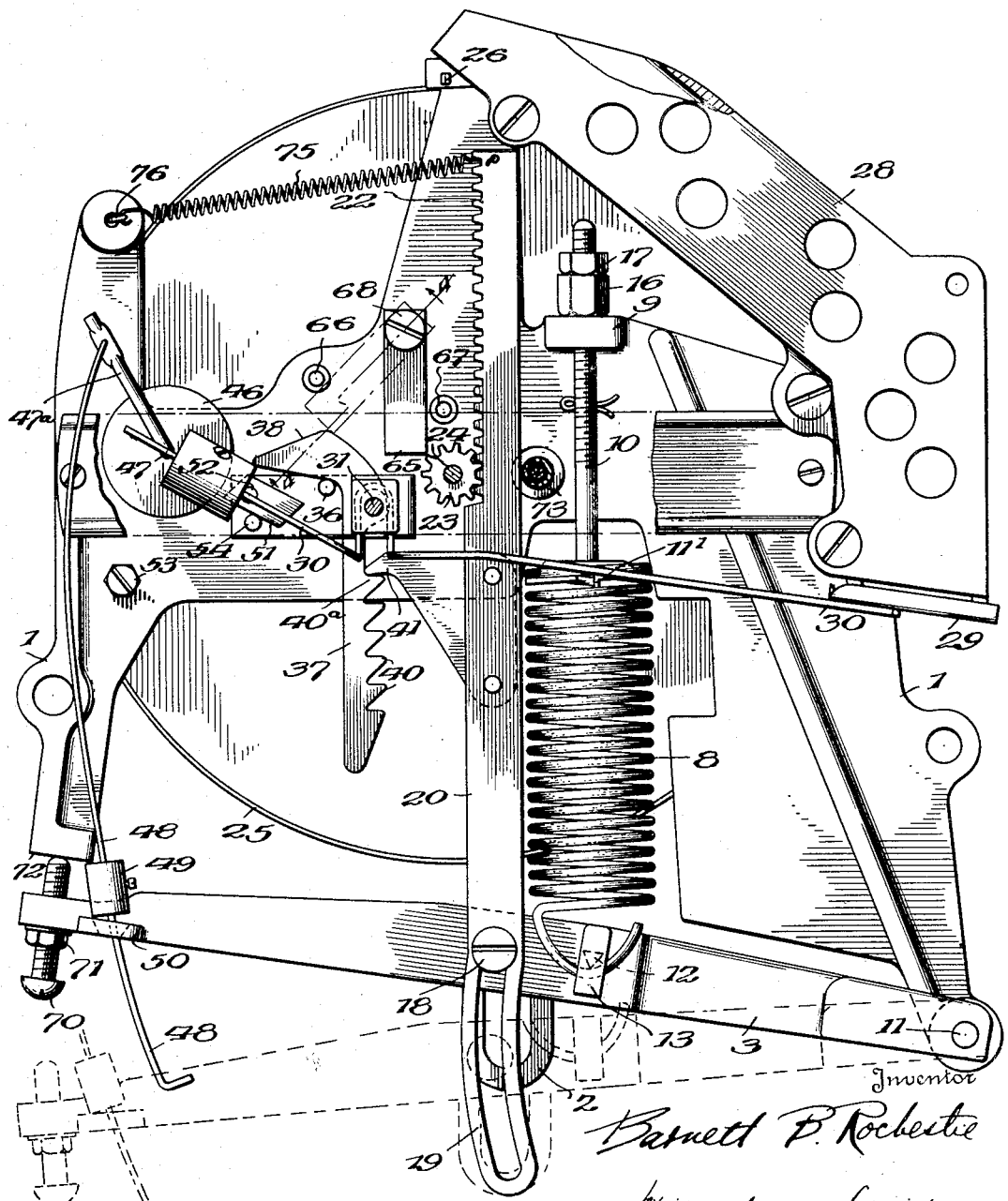
Figure 5:
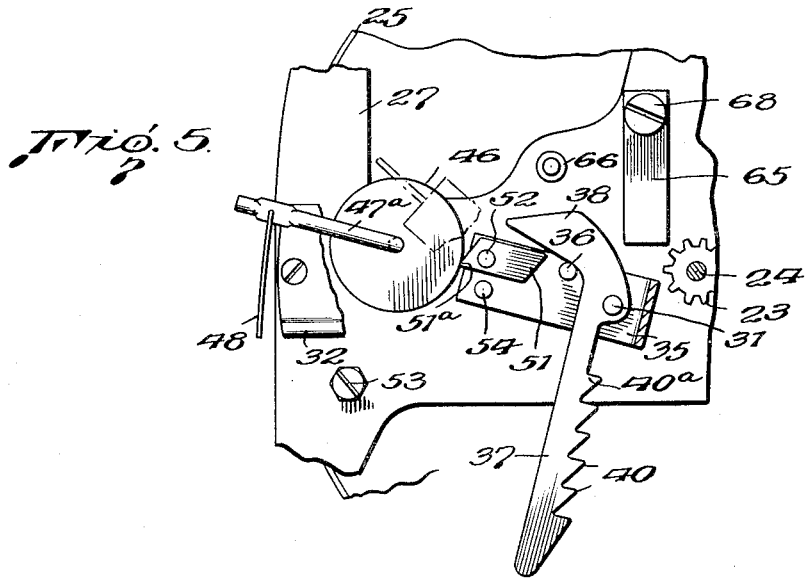
Figure 6:
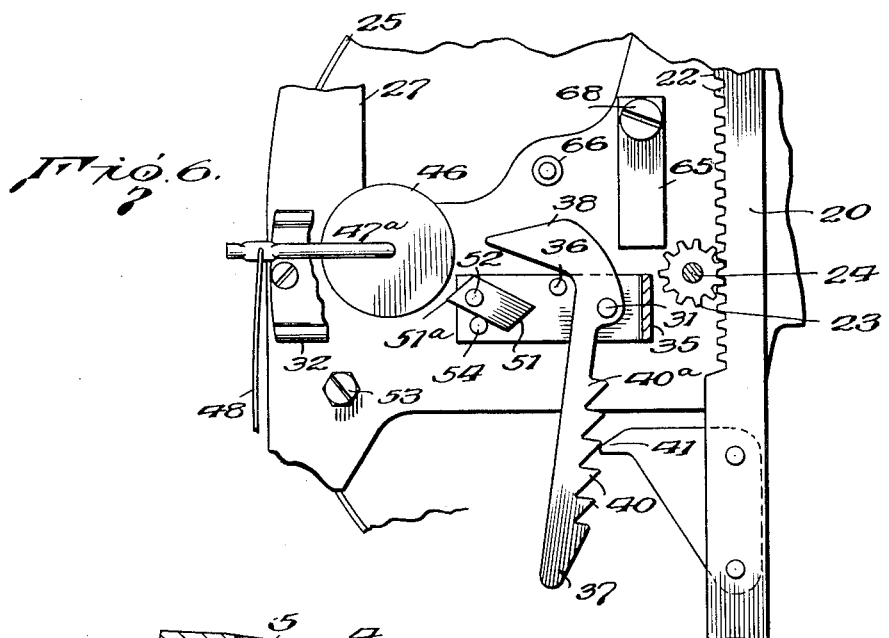

Other objects and purposes will appear from the accompanying description of a preferred embodiment of the invention taken in conjunction with the accompanying drawings, wherein Fig. 1 is a front elevation of my mechanism in normal position with parts thereof broken away and parts in section for the purpose of clarity; the dotted lines indicating the position of the weighing lever upon the application of a weight to the machine, Fig. 2 is a portion of the mechanism shown in Fig. 1 with the releasing mechanism in operative position, Fig. 3 is a sectional view along line 3—3 of Fig. 2, Fig. 4 is a sectional view along line 4—4 of Fig. 1, Fig. 5 is a detailed view of a portion of the mechanism shown in Fig. 2 at the instant the release pawl changes its position from that shown in Fig. 2 to that shown in Fig. 1, Fig. 6 is a detailed view of a portion of the mechanism during the return movement thereof after a weight indication.

Figure 7:
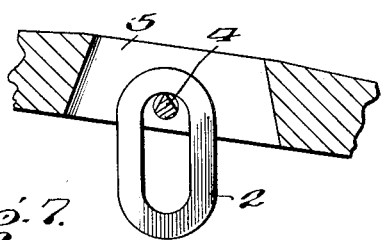

Fig. 7 is a longitudinal sectional view of the mid-portion of the weighing lever shown in Fig. 1.

In Fig. 1, the frame of the mechanism 1 is suitably mounted in a weighing machine frame. The platform mechanism with its associated lever system, casing, and standards extending upwardly, are of the conventional type and therefore are not illustrated in the drawings. The draft rod leading from the lever system is hooked to ring 2. The ring 2 is mounted upon the weighing lever 3 by a knife edge 4 extending across recess 5 in lever 3, in which recess the ring 2 is freely movable. The weighing lever 3 is freely rotatable upon pivot pin 11 extending through the frame, the bifurcated portion 3a of the weighing lever being rotatably mounted upon the extremities of the pin 11. A weighing spring 8 is suspended from the lug 9 in the machine frame by means of bolt 10 terminating in calibrating washer 11' which engages the turns of the spring. The other end of the spring is mounted upon knife edge 12, disposed across the weighing lever 3 and lug 13. The spring is capable of calibration by means of adjusting nut 16 and lock nut 17.

A shouldered stop screw 18 is fixed in weighing lever 3, which is freely movable in recess 19 of gear rack 20. This screw tends to assume a position in the recess in accordance with the weight applied upon weighing lever 3 acting against the force of spring 8, as indicated in dotted lines in Fig. 1. The screw 18 acts as a stop for the gear rack 20 upon the release of the machine. A series of teeth 22 upon one edge of gear rack is in engagement with a pinion 23 rigidly mounted upon an indicating shaft 24, mounted in a ball bearing in the frame. Rigidly mounted upon said shaft is a dial 25 having suitable weight graduations inscribed thereon. A stationary pointer 26, fixed in the machine frame, is cooperatively disposed with respect to the dial. The movement of the gear rack is transferred to the indicating shaft, the extent of rotation of which gives an indication of the weight applied to the machine. If the machine had been previously released by the dropping of a coin, as described hereinafter, an indication of the weight applied to the machine is immediately obtained. If no coin had been dropped, arm 3 with the stop 18 thereon are merely positioned preparatory to rendering a weight indication upon the execution of the release of the mechanism.

The weight indicating mechanism is released upon the dropping of a coin through chute 28. The coin strikes the basket 29 which is mounted at one end of wire arm 30, and rocks the same about a pivot pin 31, fixed in the machine between a wall thereof and a metal strap 32. This rocking is effected against the action of a weight 33 fixed near the other end of wire arm 30. A J-shaped bracket or supporting member 35, (Fig. 3) is rigidly connected with wire arm 30 and executes the same movements as that arm. On the long inwardly-facing surface of this bracket is mounted a pin or lug 36 which acts as a stop for the rearward extension 38 of ratchet segment 37 which is freely rotatable upon pivot pin 31 between the long and short arms of J-shaped bracket 35. Since the center of gravity of this ratchet segment is to the left of its support, the same tends to assume the normal position indicated in Fig. 1, with the rear face of extension 38 abutting pin 36. Ratchet teeth 40 are provided upon the front side of segment 37 and cooperate with locking pawl 41 rigidly fixed to rack gear 20. The uppermost tooth 40a prevents the downward movement of the gear rack until the locking pawl is released by the rocking of bracket 35 and the entrainment of ratchet segment 37 by pin 36, when tooth 40a is retracted from the path of pawl 41. This position of the parts is indicated in Fig. 2.

A novel mechanism for restoring the releasing elements consists of the following assembly. A releasing roller 46 having a smooth periphery is rigidly connected with its shaft 47, which in turn is rotatably mounted in the machine frame. A crank arm 47a is fixed to shaft 47 at one end, and at its other end has jointed thereto wire arm 48. A weight 49 is fixed to arm 48 which tends to pull said arm downwardly. A lug 50 integral with weighing lever 3 limits the downward movement of arm 48. Thus when the weighing lever moves downwardly upon the application of a weight to the machine, arm 48 moves downwardly to rotate roller 46 in a counter-clockwise direction. At the return motion of arm 3, 48 moves upwardly to rotate roller 46 in a clockwise direction. Stop screw 53 prevents wire arm 48 from bringing the crank arm 47a beyond the dead center thereof to cause the crank arm to operate undesirably upon the right rather than upon the left side of shaft 47.

A pawl 51, shaped as shown in Figs. 1, 2, and 7, is loosely mounted upon shouldered pin 52 in bracket 35, and cooperates in a peculiar manner with roller 46. A pin 54 in bracket 35 supports pawl 51. The part of the pawl nearest roller 46 is pointed, and is designated by 51a. Pin 52 is so mounted upon bracket 35 at such a point that in the normal untripped position of the parts shown in Fig. 1, the distance between 51a and 31, plus the radius of 46 is slightly greater than the distance between 47 and 31, and 52 is slightly below the center-line joining 47 and 31. Thus upon the rocking of bracket 35, pawl 51 experiences a slight lifting from pin 54 in order to impass roller 46. In seeking to return under the action of weight 33, the parts assume the position indicated in Fig. 2, wherein pointed end 51a of pawl 51 is above the center-line joining 47 and 31 and the upward reaction imposed by roller 46 against pointed end 51 is taken up by pin 54 without the yielding of the pawl. The releasing mechanism parts are restored only after the completion of a weight indication and the initiation of the return movement of the weighing lever and associated parts to their normal position. The beginning of the clockwise rotation of roller 46 imparts a slight impelling force to the point 51a of pawl 51, to lift the same slightly from pin 54 (Fig. 5), and to permit the bracket 35, wire arm 30, and associated parts to resume their position indicated in Fig. 1. Although ratchet segment 37 is brought back to the position indicated in Fig. 1, the return movement of rack gear is unimpeded since the ratchet segment 37 is freely rockable in a clockwise direction, and the pawl 41 may successively travel along the teeth 40 until zero position is reached, (Fig. 7). The teeth 40 are so shaped as to allow the retrograde movement of pawl 41 and yet prevent a repeated indication of a weight without a newly executed release of the mechanism occasioned by the dropping of another coin.

Tension spring 75 connected between the top of gear rack 20 and a pin 76 in frame 1 serves to prevent lost motion between the teeth of rack 20 and pinion 23. The left suspension point of the spring at 76 is placed substantially midway between the limits of travel of the top of the gear rack from its zero to full capacity positions, and does not interfere with the downward or upward movement of the gear rack. Roller 73 is disposed between a wall of the machine frame and metal strap 32 at the rear edge of gear rack 20 for assuring a positive engagement between the teeth of the rack and pinion 23.

At the free end of weighing lever 3 is provided adjusting screw 70 cooperating with lug 72 on the machine frame to adjust the scale to zero setting. A lock nut 71 is provided on the screw to lock it in adjusted position. This adjustment in conjunction with the locking pawl 41 on gear rack 20 enables the registry of a slight weight indication upon the loading of the platform which is indicative of the liveness of the scale. This indication is possible by a slight spacing between tooth 40a and locking pawl 41.

In order to preclude the possibility of obtaining a fraudulent weight indication by rocking the scale to the left to disengage ratchet segment 37 from the path of locking pawl 41, a locking cam 65 is provided, adapted to swing synchronously with the ratchet segment to block the complete disengagement of the latter. This locking cam is mounted for free rotation upon headed pin 68 between lugs 66 and 67 on the machine frame. The cam normally hangs in the position shown in solid lines in Fig. 1, but when the machine is rocked to the left it assumes the position shown in dot-dash lines and cooperates with extension 38 to prevent the rocking of segment 37 from disengaging position with locking pawl 41.

The machine operates in the following manner: Upon the application of a weight to the machine, weighing lever 3 with stop 18 thereon rock downwardly an amount corresponding to the weight. Roller 46 rotates in a counter-clockwise direction as wire arm follows lever 3. If the release mechanism had been previously tripped by the dropping of a coin, gear rack 20 is free to impart movement to indicating shaft 24, otherwise the release mechanism is now tripped to obtain a weight indication. The releasing mechanism remains in its tripped position by means of pawl 51 and roller 46 until the weighing lever starts on its return movement when the resulting clockwise rotation experienced by roller 46 restores the releasing mechanism to its normal position. Pawl 41 travels along teeth 40 of oscillatable ratchet segment until the dial upon the indicating shaft is returned to zero position in preparedness for another operation. The teeth on ratchet segment 37 prevent a repeated weight indication without a newly executed tripping of the releasing mechanism.

Having described my invention, what I claim is:

1. In a weighing mechanism, a weighing spring, a weighing lever connected to one end of said spring, a fulcrum for said lever, a bearing for the draft rod of the mechanism mounted on said lever whereby said weighing lever and spring are positioned in accordance with the weight applied to said weighing mechanism, a stop mounted upon said lever, a weight indicating mechanism controlled by said stop comprising an indicating shaft, a pinion mounted upon said shaft, a gear rack in engagement with said pinion, and a recess in said rack cooperating with said stop on said weighing lever, a locking pawl fixed upon said rack, release means for said pawl comprising a ratchet segment having teeth cooperating with said locking pawl and a projection, a pivotal mounting for said segment, a supporting member freely rotatable on said mounting, actuating means for rocking said supporting member, a lug on said member in engagement with said projection on said ratchet segment whereby said ratchet teeth are rocked from the path of said locking pawl, holding means for said ratchet segment in its retracted position, and means operative at the initiation of the return movement of said weighing lever for releasing said holding means whereby said ratchet segment is brought into cooperation with said locking pawl in the course of the return movement of said gear rack.

2. In a weighing mechanism, a weighing spring, a weighing lever connected to one end of said spring, a fulcrum for said lever, a bearing for the draft rod of the mechanism mounted on said lever whereby said weighing lever and spring are positioned in accordance with the weight applied to said weighing mechanism, a stop mounted upon said lever, a weight indicating mechanism controlled by said stop comprising an indicating shaft, a pinion mounted upon said shaft, a gear rack in engagement with said pinion, and a recess in said rack cooperating with said stop on said weighing lever, a locking pawl fixed upon said rack, release means for said pawl comprising a ratchet segment having teeth cooperating with said locking pawl and a projection extending rearwardly of said teeth, said teeth being so shaped that they block the movement of said pawl in one direction and allow the progressive movement of said pawl in the reverse direction, a pivot pin for said ratchet segment, said segment being freely rotatable upon said pivot pin at a point displaced from the center of gravity thereof, whereby said segment normally tends to engage said pawl, a supporting member also freely rotatable upon said pivot pin, actuating means for rocking said supporting member, a lug on said member in engagement with said projection on said ratchet segment whereby said ratchet teeth are rocked from the path of said locking pawl and said gear rack is released for movement until said stop is engaged thereby, holding means for said ratchet segment in its retracted position, and means operative at the initiation of the return movement of said weighing lever for releasing said holding means whereby said actuating means is returned to its normal position and said teeth of said ratchet segment are brought into engagement with said locking pawl, permitting the return movement of said pawl but preventing another weight indication in the course of the same machine operation.

3. In a weighing mechanism, a weighing spring, a weighing lever connected to one end of said spring, a fulcrum for said lever, a bearing for the draft rod of the mechanism mounted on said lever whereby said weighing lever and spring are positioned in accordance with the weight applied to said weighing mechanism, a stop mounted upon said lever, a weight indicating mechanism controlled by said stop comprising an indicating shaft, a pinion mounted upon said shaft, a gear rack in engagement with said pinion, and a recess in said rack cooperating with said stop on said weighing lever, a locking pawl fixed upon said rack, release means for said pawl comprising a ratchet segment having teeth cooperating with said locking pawl and a projection extending rearwardly of said teeth, said teeth being so shaped that they block the movement of said pawl in one direction and allow the progressive movement of said pawl in the reverse direction, a pivot pin for said ratchet segment, said segment being freely rotatable upon said pivot pin at a point displaced from the center of gravity thereof, whereby said segment normally tends to engage said pawl, a supporting member also freely rotatable upon said pivot pin, coin controlled actuating means connected to said supporting member acting against a yielding force, a lug on said member in engagement with said projection on said ratchet segment whereby said ratchet teeth are rocked from the path of said locking pawl and said gear rack is released for movement until said stop is engaged thereby, holding means for said supporting member and said ratchet segment in its retracted position, and means operative at the initiation of the return movement of said weighing lever for releasing said holding means whereby said actuating means is returned to its normal position under the influence of said yielding force and said teeth of said ratchet segment are brought into engagement with said locking pawl, permitting the return movement of said pawl but preventing another weight indication in the course of the same machine operation.

4. The combination claimed in claim 3 wherein said holding means for said supporting member and said ratchet segment comprises a roller controllable by said weighing lever, a pawl rotatably mounted upon said supporting member, a stop pin for said pawl, with an end of said pawl adapted to engage the peripheral surface of said roller as said pawl is locked against rotation by said stop pin.

5. The combination claimed in claim 3 wherein said holding means for said supporting member and said ratchet segment comprises a roller, a central shaft fixed to said roller, a crank arm connected to said shaft, a weighted arm connected to said crank arm movable synchronously with said weighing lever, a pawl rotatably mounted upon a pivot pin on said supporting member, a stop pin for said pawl, a pointed end upon said pawl, the distance between said pointed end and the pivot of said supporting member plus the radius of said roller being slightly greater than the distance between said central shaft and said pivot of said suporting member.

6. The combination claimed in claim 1 wherein is provided a locking cam rotatably mounted above said projection of said ratchet segment adapted to lock said ratchet segment upon the rotation of said cam from its normal position.

7. The combination claimed in claim 1 wherein means is provided for maintaining said gear rack in engagement with said pinion comprising a tension spring connected at one end thereof to said gear rack, a pivot point for said spring at the other extremity thereof, said pivot point positioned substantially midway between the limits of travel of the other extremity of said spring in accordance with the zero and full capacity loadings of said machine.

8. In a weighing machine, a weighing lever, an indicating shaft, setting means for controlling said indicating shaft by said weighing lever, means for releasing said setting means before or after the application of a load upon the machine comprising a substantially rectilinear ratchet segment, means for holding said releasing means in effective position in the course of obtaining a weight indication, and means for rendering inoperative said holding means at the beginning of the return movement of said setting means after a weight indication.

9. In a weighing mechanism, a weighing lever, an indicating shaft, means for controlling said indicating shaft by said weighing lever, releasing means for said control means, means for holding said releasing means in effective position in the course of obtaining a weight indication, comprising a roller rotatable in one direction by the movement of said weighing lever in the course of loading thereof, a rotatable pawl freely movable past said roller in the operative movement of said releasing means and blocked by said roller against reverse movement, and transmission means intermediate said roller and said weighing lever for rotating said roller in a reverse direction during the unloading thereof, said reverse rotation furthermore enabling the reverse movement of said releasing means.

10. In a weighing machine, a weighing lever, an indicating shaft, an actuating member for rotating said indicating shaft in accordance with the setting of said weighing lever, a locking element fixed on said actuating member, a ratchet segment normally blocking the path of said locking element, coin-controlled means for displacing said ratchet segment from its blocking position, means for holding said last-mentioned means in releasing position, and means for rendering inoperative said holding means at the initiation of the return movement of said actuating member after a weight indication.

11. In a weighing machine, a weighing lever, an indicating shaft, an actuating member for rotating said indicating shaft in accordance with the setting of said weighing lever, locking means for said actuating member, coin-controlled means for releasing said locking means to render operative said indicating shaft, and a pivoted locking cam cooperating with said locking means to prevent a release thereof upon the tilting of the machine.

12. In a weighing machine, a weighing lever, an indicating shaft, an actuating member for rotating said indicating shaft in accordance with the setting of said weighing lever, a locking element fixed on said actuating member, a ratchet segment normally blocking the path of said locking element, coin-controlled means for displacing said ratchet segment from its blocking position, means for holding said last-mentioned means in releasing position, means for rendering inoperative said holding means at the initiation of the return movement of said actuating member after a weight indication, and a pivoted locking bar adjacent said ratchet segment adapted to move in conformity with a fraudulent tilting of the machine to prevent a displacement of the ratchet segment from its blocking position.

13. In a weighing machine, a weighing lever, an indicating shaft, a pinion on said shaft, a gear rack in mesh with said pinion for rotating said indicating shaft in accordance with the setting of said weighing lever, a locking element fixed on said gear rack, a ratchet segment normally blocking the path of said gear rack, coin-controlled means for displacing said ratchet segment from its blocking position to allow the engaging movement of said gear rack with said pinion, and means for maintaining a close contact between said rack and pinion comprising a spring tensioned between a fixed point and a point on said rack, said fixed point being intermediate the limits of travel of the point on said rack between its rest position and its loaded position.

14. The combination claimed in claim 10 wherein the holding means for the coin-controlled means and the displaced ratchet segment comprises a peripheral surface controllable by said weighing lever, a pawl rotatably mounted upon said last-mentioned means, a stop pin for said pawl, with an end of said pawl adapted to engage said peripheral surface as said pawl is locked against rotation by said stop pin.

15. The combination claimed in claim 10 wherein the holding means for the coin-controlled means and the displaced ratchet segment comprises a peripheral surface controllable by said weighing lever, a pawl rotatably mounted upon said last-mentioned means, a stop pin for said pawl, with an end of said pawl adapted to engage said peripheral surface as said pawl is locked against rotation by said stop pin, and the means for rendering inoperative said holding means comprises a central shaft for said peripheral surface, connections intermediate said central shaft and the weighing lever for imparting rotation to said peripheral surface upon the initiation of the return movement of said lever, whereby said pawl is impelled from its stop pin and frees for movement said coin controlled means and ratchet segment.

BARNETT B. ROCHESTIE.